(No Model.)  3 Sheets—Sheet 2.

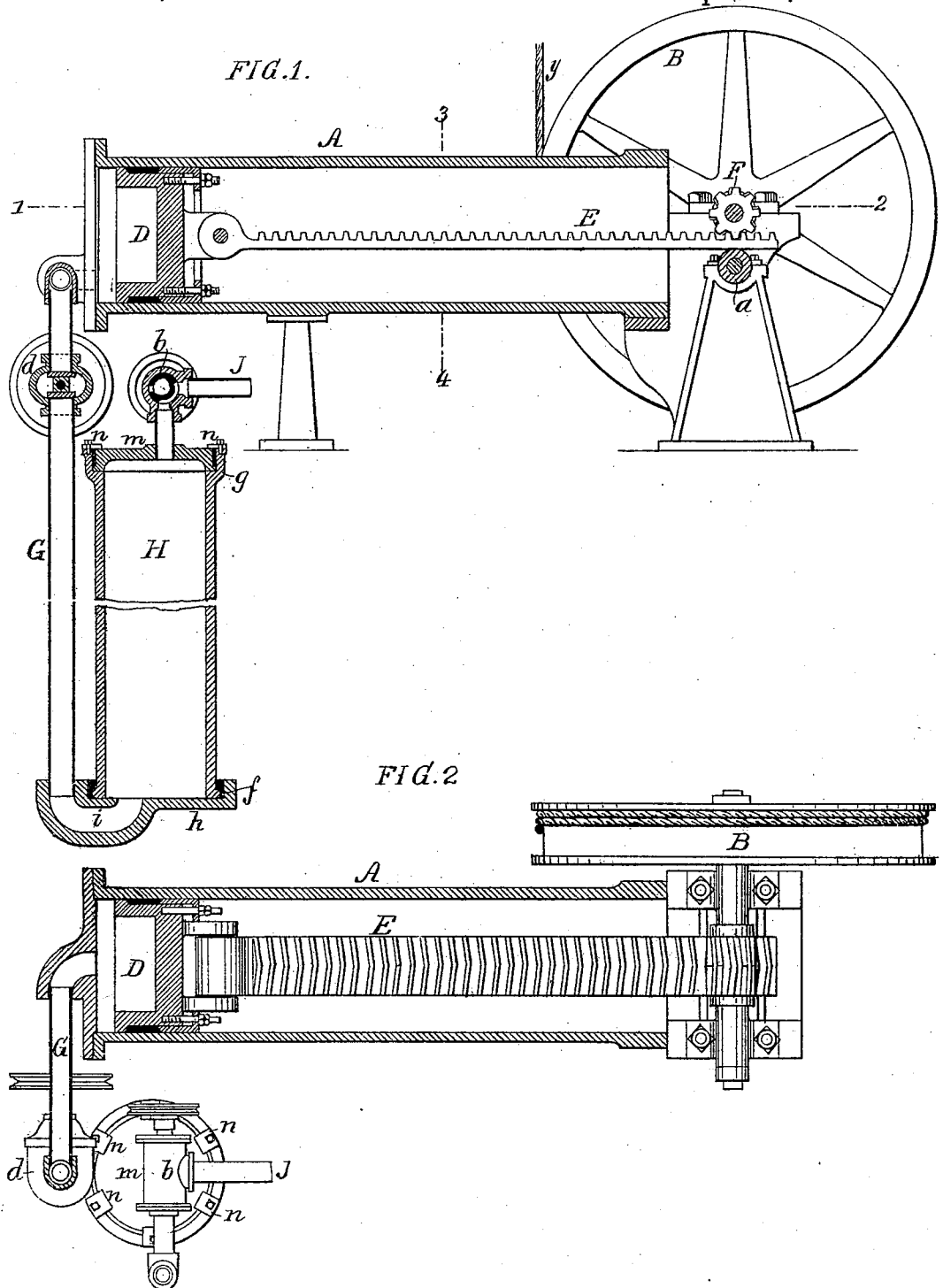

W. H. RIDGWAY.
ELEVATOR.

No. 276,076.  Patented Apr. 17, 1883.

WITNESSES:
David Williams
James F. Tobin

INVENTOR:
William H. Ridgway
by his Attorneys
Howson and Son

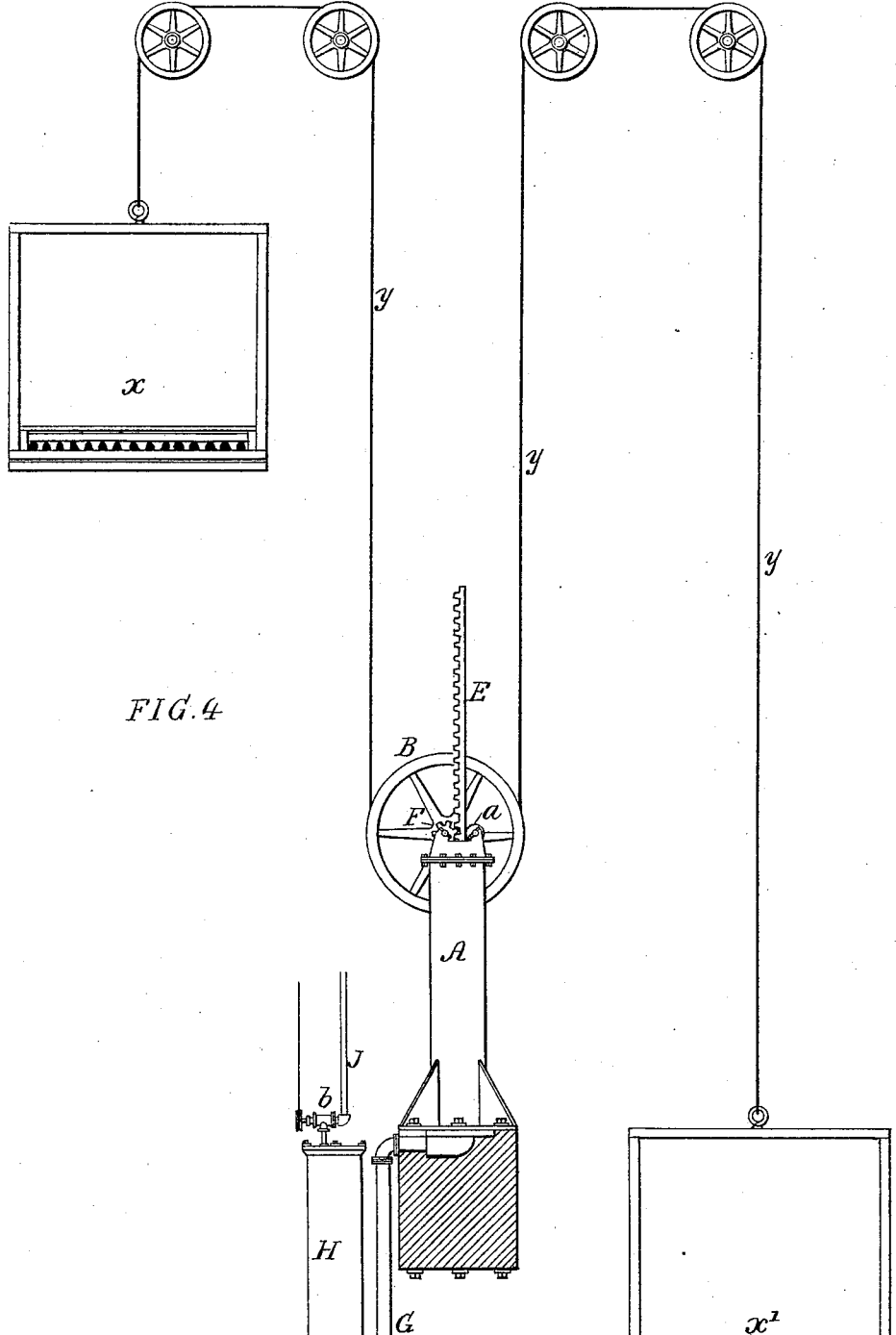

UNITED STATES PATENT OFFICE.

WILLIAM H. RIDGWAY, OF COATESVILLE, PENNSYLVANIA.

ELEVATOR.

SPECIFICATION forming part of Letters Patent No. 276,076, dated April 17, 1883.

Application filed November 27, 1882. (No model.)

*To all whom it may concern:*

Be it known that I, WILLIAM H. RIDGWAY, a citizen of the United States, and a resident of Coatesville, Chester county, Pennsylvania, have invented certain Improvements in Elevators, of which the following is a specification.

My invention relates to certain improvements in hoisting apparatus in which water under pressure is the medium for actuating the piston in the hoisting-cylinder, my improvements relating to means for regulating the flow of the water to and from the cylinder, to devices whereby the movement of the piston is caused to effect the rotation of the winding-drum, and to minor details in the construction of the apparatus.

Figure 3:
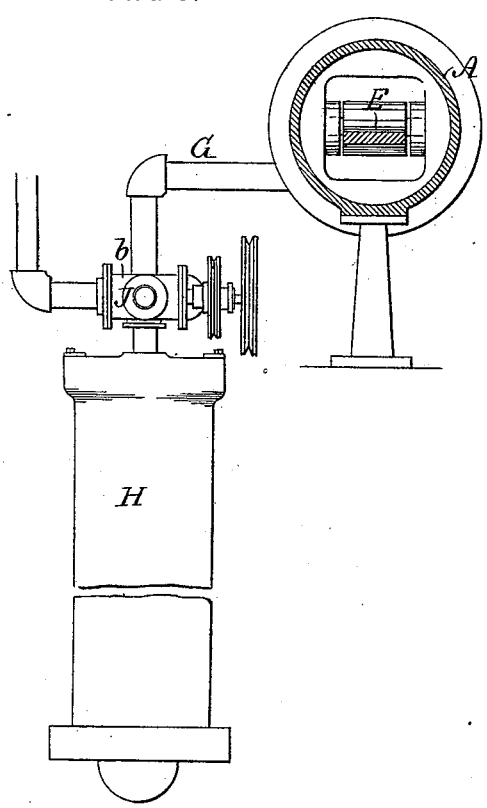

In the accompanying drawings, Figure 1, Sheet 1, is a longitudinal section of one form of my improved hoisting apparatus; Fig. 2, a sectional plan on the line 1 2; Fig. 3, Sheet 2, a transverse section on the line 3 4; Fig. 4, Sheet 3, a diagram showing a double hoist, and illustrating one of the features of my invention; and Figs. 5 and 6, Sheet 2, detached sectional views, on an enlarged scale, of part of the apparatus.

In Figs. 1, 2, and 3, A represents the hoisting-cylinder, which is closed at one end and open at the opposite end, the bearings for the shaft of the winding-drum B being adjacent to said open end of the cylinder.

D is the piston, which is suitably packed, and to which is pivoted the inner end of the rack E, the latter gearing into a pinion, F, on the shaft of the winding-drum, and being supported by a roller, *a*, the spindle of which is adapted to bearings adjacent to or forming part of those for the shaft of the drum.

The closed end of the cylinder A, in the rear of the piston, communicates through a pipe, G, with the lower end of a cylinder, H, and the upper end of the latter communicates through a pipe, J, with an adjacent steam-generator; or the upper end of the cylinder H may be cut off from the steam-generator and put in communication with the atmosphere by operating a three-way valve, *b*, in the pipe J. A valve, *d*, in the pipe G serves to open and close communication between the cylinders A and H, and both valves *b* and *d* should be under control of the occupant of the hoisting-cage by means of cords adapted to pulleys on the stems of the valves, or in some other suitable manner. When the parts are in the positions shown in Figs. 1, 2, and 3, the cage is at its lowest point, and the pipe G and cylinder H are full of water. Steam under pressure, being admitted to the upper end of the cylinder H, imparts pressure to the water therein, and on opening the valve *d* this water under pressure acts upon the piston D and drives the same forward in the cylinder A, the rack E acting upon the pinion F and causing the rotation of the drum B, so as to wind up the hoisting-rope *y* and elevate the cage. The cage can be stopped and held in any position by closing the valve *d*, so as to prevent the backward flow of water through the pipe G; and by turning the valve *b* so that the steam can escape through the same from the cylinder H, the valve *d* being open, the cage will descend by its own weight, the piston D being forced into the cylinder A and the water returned to the cylinder H. By permitting the steam to act directly upon the surface of the water in the cylinder H, the latter is continually replenished by the water of condensation, and slight losses by leakage are thus compensated for.

The cylinder H is economically made by employing an ordinary cast-iron water-pipe having a flange, *f*, at one end and a bell-mouth, *g*, at the other. The flanged end of the pipe is adapted to a recess in a base-plate, *h*, and is secured therein by lead or other suitable cement, the base having a passage, *i*, communicating with the pipe G. To the bell-mouthed upper end of the pipe is adapted a cover-plate, *m*, the joint being properly packed or cemented, and the plate secured in position by means of a number of segments, *n*, bolted to the upper end of the pipe; or a complete ring may, if desired, be used in place of these segments.

Figure 5:
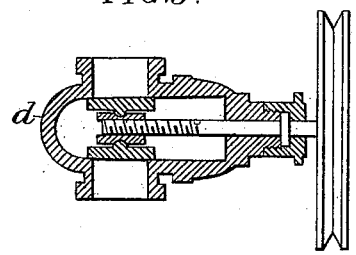

An ordinary stop-valve, *d*, with sliding gates, as shown in Fig. 5, is used in the present instance to regulate the flow of water through the pipe G; but a rotary valve may be used, if desired.

Fig. 4 shows the arrangement which I use for causing the single-acting cylinder to operate alternately two hoists, *x* and *x'*, one ascending as the other descends, this form of hoist being intended principally for feeding blast-furnaces and similar work. In this case a cage is secured to each end of a hoisting-rope, $y$, which passes round the drum B. The cage $x$ is weighted to an extent somewhat greater than any load calculated to be put upon the cage $x'$, and it is the cage $x$ which is elevated on the outward movement of the piston, due to the action of the water under pressure. When pressure is removed from the water, however, the excess of weight in the cage $x$ over that of the loaded cage $x'$ is such that said cage $x$ descends and the cage $x'$ is elevated, the piston being thrust into the cylinder A prior to another stroke. It will thus be seen that each outward or active stroke of the piston raises not only the weight of the cage $x$ and its load, but the extra weight necessary to effect the elevation of the cage $x'$ on the inward or inactive stroke of the piston.

Figure 6:
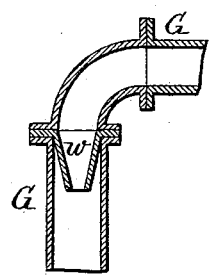

In this apparatus I prefer to use, in place of a valve in the pipe G, a device such as shown in Fig. 6, this device being intended to permit a freer flow of water from the cylinder A through the pipe G than in the opposite direction, this being advisable, because the water is subjected to less pressure on the inward movement of the piston than on the outward movement, when the full steam-pressure is exerted. The device consists simply of a nozzle, $w$, introduced into the pipe G, water passing from the cylinder A forward through the nozzle, but water moving in the opposite direction being compelled to pass backward through the nozzle, so that while the flow from the cylinder is not materially retarded the flow into the cylinder meets with considerable obstruction.

It may be advisable to use this device in some cases in addition to the valve $d$, in order that the speed of ascent and descent of the cage need not be dependent wholly on the adjustment of said valve.

By pivoting the inner end of the rack E to the piston D said rack is permitted to move transversely at the outer end, independently of the piston, and is thus free to accommodate itself to inequalities due to wear or improper setting of the shaft of the hoisting-drum or supporting-roller. The piston is thus prevented from binding in the cylinder, as it would be apt to do if the rack were rigidly secured to it.

I claim as my invention—

1. The combination of the cylinder A and its piston, the water-cylinder H, the valved connecting-pipe G, and the steam-pipe J, having a three-way valve, $b$, as set forth.

2. The combination of the cylinder A and its piston, the hoisting-drum shaft and its pinion F, the rack E, pivoted to the piston and adapted to the pinion F, and a bearing for the back of the rack, as set forth.

3. The combination of the cylinder H, having a bell-mouthed upper end, with the cover-plate $m$ and the retaining segments or ring $n$, as set forth.

In testimony whereof I have signed my name to this specification in the presence of two subscribing witnesses.

WM. H. RIDGWAY.

Witnesses:
 HARRY DRURY,
 HARRY SMITH.